United States Patent
Bhupati

(10) Patent No.: US 9,692,885 B2
(45) Date of Patent: Jun. 27, 2017

(54) DETERMINING SCAM RISK DURING A VOICE CALL

(71) Applicant: Microsoft Technology Licensing, LLC, Redmond, WA (US)

(72) Inventor: Dhirendra Bhupati, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/943,720

(22) Filed: Nov. 17, 2015

(65) Prior Publication Data

US 2017/0142252 A1    May 18, 2017

(51) Int. Cl.
| | | |
|---|---|---|
| H04M 7/02 | (2006.01) | |
| H04M 3/22 | (2006.01) | |
| H04W 12/12 | (2009.01) | |
| H04M 1/57 | (2006.01) | |
| H04M 1/725 | (2006.01) | |

(52) U.S. Cl.
CPC ......... H04M 3/2281 (2013.01); H04M 1/575 (2013.01); H04M 1/72563 (2013.01); H04W 12/12 (2013.01)

(58) Field of Classification Search
CPC ....................................................... H04M 3/22
USPC ................................................ 455/410–414.1
See application file for complete search history.

(56) References Cited

U.S. PATENT DOCUMENTS

| | | | |
|---|---|---|---|
| 6,078,807 A | 6/2000 | Dunn et al. | |
| 7,995,995 B2 | 8/2011 | Novack et al. | |
| 8,086,461 B2 | 12/2011 | De Los Reyes et al. | |
| 8,175,650 B2 | 5/2012 | Colson et al. | |
| 8,510,215 B2 | 8/2013 | Gutierrez et al. | |
| 8,724,779 B2 | 5/2014 | Akolkar et al. | |
| 8,805,347 B2 | 8/2014 | Lemke et al. | |
| 8,812,318 B2 * | 8/2014 | Broman | G06Q 20/341 704/246 |
| 9,001,985 B2 | 4/2015 | Cox et al. | |
| 9,432,506 B2 * | 8/2016 | Tatourian | H04M 3/436 |
| 2008/0159488 A1 | 7/2008 | Raja | |
| 2011/0002450 A1 | 1/2011 | Feng et al. | |
| 2011/0093266 A1 | 4/2011 | Tham | |
| 2012/0287823 A1 | 11/2012 | Lin | |
| 2014/0136194 A1 | 5/2014 | Warford et al. | |
| 2014/0201246 A1 | 7/2014 | Klein et al. | |
| 2014/0247926 A1 | 9/2014 | Gainsboro et al. | |

OTHER PUBLICATIONS

"TrueCaller", Published on: Aug. 16, 2014 Available at: http://digitalinspiration.com/caller-indentification-688.

* cited by examiner

*Primary Examiner* — Michael T Vu
(74) *Attorney, Agent, or Firm* — Alleman Hall Creasman & Tuttle LLP

(57) ABSTRACT

Examples are disclosed that relate to detecting and providing alerts regarding a possible scam voice call. One example provides a method comprising receiving a voice call, and obtaining, during the voice call, a caller number and a caller voice sample. The method further comprises obtaining, via the caller number and the caller voice sample, a risk determination regarding the risk that the voice call is a scam call, and based upon the risk determination, outputting, during the voice call, an alert regarding the risk that the voice call is a scam call.

20 Claims, 5 Drawing Sheets

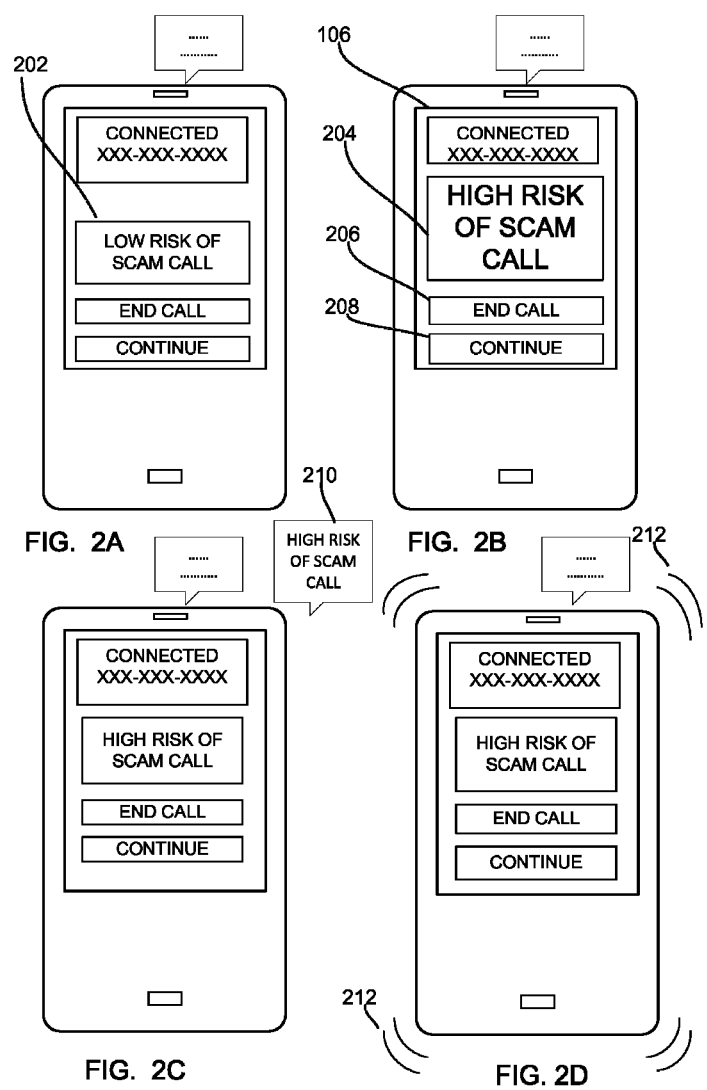

DETERMINING SCAM RISK DURING A VOICE CALL

BACKGROUND

Voice calls, such as those made by traditional telephones, cell phones, and voice over IP (VOIP) calls, may be used to attempt to fraudulently obtain money or other property from people. Such calls may be referred to as scam calls. Scam calls are often designed to trick recipients into believing that the call originated from an official source, such as a tax or legal authority. Further, the recipients of such calls may be selected based upon a perceived vulnerability to believe the call. For example, many scam calls may target senior citizens with legitimate-sounding demands.

SUMMARY

Examples are disclosed that relate to detecting and providing alerts regarding a possible scam voice call. One example provides a method comprising receiving a voice call, and obtaining, during the voice call, a caller number and a caller voice sample. The method further comprises obtaining, via the caller number and the caller voice sample, a risk determination regarding a risk that the voice call is a scam call, and based upon the risk determination, outputting, during the voice call, an alert regarding the risk that the voice call is a scam call.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-D show example alerts that may be displayed after a risk of a possible scam call has been determined.

DETAILED DESCRIPTION

As mentioned above, it may be difficult for a person targeted by a scam call to determine that the call is a scam, as many scam calls may sound legitimate. For example, a person may perform internet searching for a caller's number for an incoming call to try to identify the caller. However, such searching may be difficult and/or inconvenient to perform either before answering the call or during the call.

Accordingly, examples are disclosed herein that relate to evaluating, during a telephone call, a risk that the call may be a scam call, and providing an alert of the determined risk during the call. Briefly, a computing system that receives the call (e.g. a smart phone or other voice communication system) may provide, for a received call, a user interface that presents an option to evaluate whether the call may be a scam call. Upon receipt of a user input selecting this option, during the call, a voice sample and the caller phone number may be recorded and compared to information regarding numbers and voice samples that are associated with a scam risk. Based upon the comparison, the system may determine whether the call is possibly a scam call, and provide an output to a user during the call regarding the determined risk. In this manner, an alert may be communicated to the user during the call without interrupting the phone call and without the caller being aware of the analysis taking place.

FIGS. 1A-D show an example voice communication device 102, and illustrate example user interactions with a scam risk alert system executed on the device 102. In the depicted example, the voice communication device 102 takes the form of a mobile phone with a touch sensitive display 106, but any other suitable voice communication device may be used, including but not limited to other telephones, laptop computers, tablet computers, desktop computers, and wearable devices, such as head-mounted displays and wrist-worn devices.

Figures 1A, 1B:
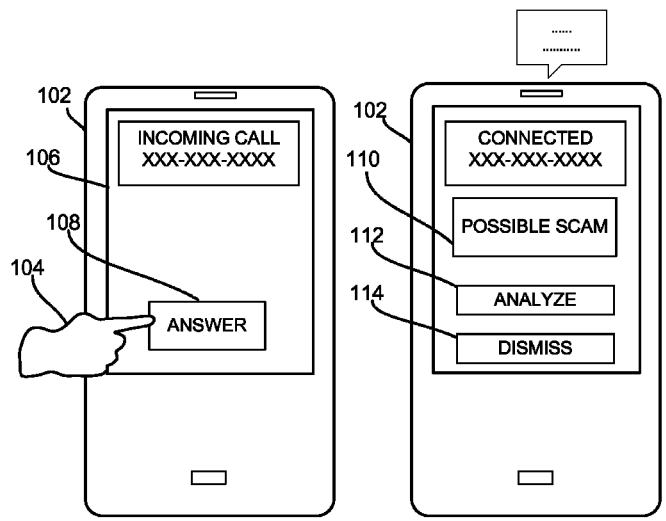
FIGS. 1A-D show example interactions between a user and an example scam risk alert system.

First referring to FIG. 1A, upon receiving an incoming call, the mobile communications device 102 alerts a user 104 of the incoming telephone call, and displays a user interface control 108 selectable to answer the call 108. If the user chooses to answer the call, the mobile communications device 102 next may perform an analysis, during the call, regarding whether the call is a possible scam call. Such analysis may be performed automatically, or upon user request. FIG. 1B shows an example user interface displayed on mobile communications device 102 that allows a user to request to perform a scam analysis. In the depicted example, the user interface includes a notification 110 of the scam analysis option 110, a user interface control 112 configured to trigger the scam analysis, and a user interface control 114 configured to dismiss the scam analysis. The notification 110 and the user interface controls 112, 114 may be displayed for all incoming calls, for incoming calls from unrecognized numbers (e.g. for numbers that are not in the user's contacts list), or for any other suitable set of incoming calls.

Figures 1C, 1D:
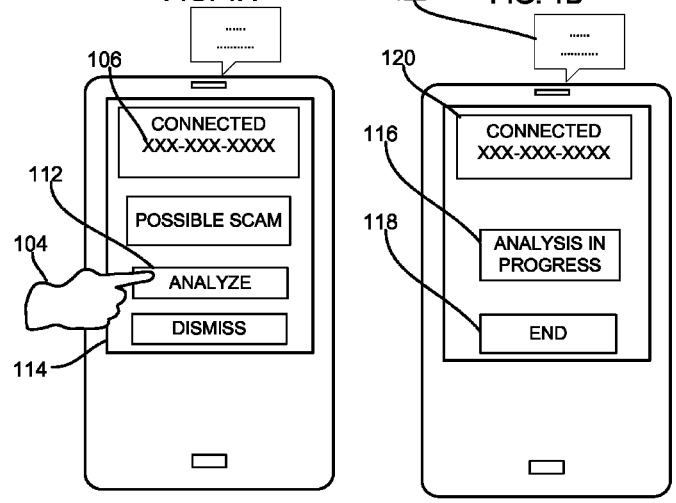

FIG. 1C depicts the user 104 choosing to perform the scam analysis by selecting the user interface control 112 configured to trigger the scam analysis, and FIG. 1D depicts an example user interface that may be displayed while the analysis is being performed, and illustrates a notification 116 that the analysis is in progress, and also a control 118 selectable to end the analysis. The voice communication device 102 may perform any suitable analysis or analyses to determine whether the call poses a scam risk. For example, the voice communication device 102 may record the number from which the call is received 120, and also may record a voice sample 122 of the caller as the caller speaks.

In some examples, the voice communication device may send the voice sample 122 and the number 120 from which the call is received to a remote scam analysis service. The remote scam analysis service may compare the voice sample to previously recorded voice samples that have been determined to be likely to be, or confirmed by call recipients to be, from scam callers, and also may compare the number from which the call was received to numbers known to be associated with scam callers. Any suitable algorithm may be used to identify the speaker based upon previously recorded voice samples. Examples include, but are not limited to, text-independent methods such as frequency estimation methods, hidden Markov models, Gaussian mixture models, pattern matching algorithms, neural networks, matrix representations, vector quantization methods, and decision trees. Based upon this comparison, the remote scam analysis service may return to the voice communication device 102 a determination of the scam risk posed by the call. In other examples, information regarding voice samples and also numbers associated with known or likely scam callers may be provided by a remote service to the voice communication device 102, and the voice communication device 102 may perform the scam analysis locally. In such examples, the locally stored voice sample information and number information may be updated by the remote surface at any suitable frequency. In any of these examples, over time, as more numbers and more voice samples are submitted for analysis and stored, scam risk determinations may become more reliable.

The risk determination that is returned to the voice communication device or produced by the voice communication device may take any suitable form. In some examples, the determination may include a simple binary determination of a low or high risk that the call is a scam call. In other examples, the determination may be more granular or detailed. For example, the determination may comprise a confidence value, such as a percentage value or fractional value (e.g. having a value of between zero and one) that represents a relative certainty of the determination. These specific implementations are described for the purpose of example and are not intended to be limiting in any manner.

In some examples, a risk determination may utilize information other than the caller number and the caller voice sample. For example, information regarding how many times and/or how frequently the caller's number has been submitted for a scam analysis may be considered, such that more frequently submitted numbers may be considered to pose a higher scam risk. Other types of information that may be considered include, but are not limited to, a region in which a call recipient resides, a time that a call is received, a region in which the caller resides (e.g. based on the caller's area code) and a time a call was made in the caller's region.

FIGS. 2A-D show examples of alerts that may be output to a user during a call based upon a scam risk analysis performed during the call. First, FIG. 2A shows a message 202 displayed on the display 106 that notifies the user that the scam risk of is the call is determined to be low. In contrast, FIG. 2B shows a message 204 notifying of a higher risk of the call being a scam call. In both cases, the user interfaces also show an "end call" control 206 and a "continue" control 208. If the user selects the "end call" control 206, the selection may be considered to be confirmation of a higher scam risk. As such, notification that the call is ended via this option may be provided to the remote service, which may store the voice sample as one associated with a higher risk of scam calls. Likewise, if the user selects the "continue" control 208, the selection may be considered to be confirmation of a lower scam risk. In this instance, the voice sample and number may not be stored, or may be stored along with information indicating that a lower scam risk is associated with the voice sample and the number. In other examples, the user interface may have any other suitable controls for accepting/rejecting calls. For example, the user interface may have separate control for ending the call without adding the caller to a scam risk information database and ending the call with adding the caller to such a database. Likewise, the user interface may include a control for adding the caller to a scam risk information database without ending the call.

Other output mechanisms also may be used to output risk notifications. For example, depending upon the type of voice communication hardware being used for the call (e.g. a smart phone held against the face or a set of earphones with a built-in microphone), the user may not be able to see a displayed risk warning. As such, as depicted in FIG. 2C, information regarding the risk determination may be output by speaker, such that the recipient of the call, but not the caller, can hear the output. This information may include a simple sound to alert the user to check the display, or may include more detailed information, such as a voice output or other acoustic output informing the user of the determined risk level. Further, in some examples, information regarding result of a risk determination may be output via a haptic output mechanism, as indicated in FIG. 2D. Such an output may take the form of a simple notification to check the display, or may represent more detailed information. For example, a duration of a vibratory output may indicate a relative risk level of the call. The above described outputs are presented for the purpose of example and are not intended to be limiting in any manner, as any other suitable outputs may be used to inform a user of a possible scam risk posed by a received call.

Figure 3:
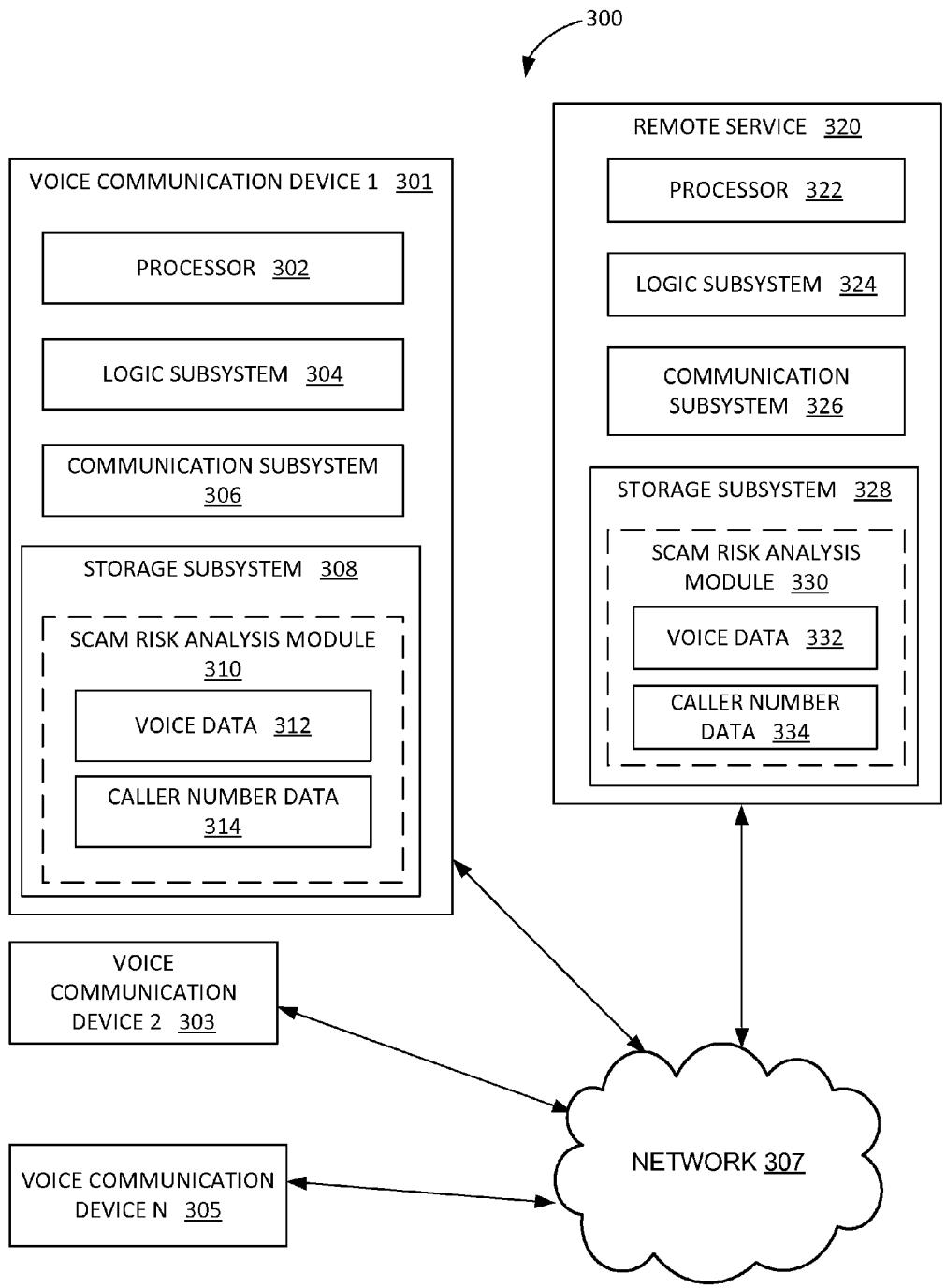
FIG. 3 shows a block diagram of an example voice communications environment in which the examples of FIGS. 1A-D and 2A-D may be implemented.

FIG. 3 shows a block diagram of an example voice communications environment 300 in which the examples of FIGS. 1A-D and 2A-D may be implemented. In the depicted example, a plurality of voice communication devices, shown as voice communication device 1 301, voice communication device 2 303, and voice communication device N 305 (wherein N is an arbitrary integer) are connected via a network 307 to a remote scam call analysis service 320. Each voice communication device is configured to receive voice calls, and may take any suitable form, including but not limited to that of a smart phone, other telephone, a laptop computer, a desktop computer, a notepad computer, or a wearable device. Further, the voice communications devices may represent devices for any suitable type of voice communication, including but not limited to traditional telephone service, cell phone service, VOIP service, and satellite phone service.

Each voice communication device comprises a processor 302, a communication subsystem 306 and a storage subsystem 308. The storage subsystem 308 stores instructions that are executable by the processor 302 to implement a scam risk analysis module, as indicate at 310. The scam risk analysis module may be configured to perform various tasks related to providing information regarding a risk of a received voice call being a scam call. For example, the scam risk analysis module may be configured to present a user interface, such as that shown in FIG. 1B, to allow a user to initiate a scam analysis by request. In other implementations, the scam risk analysis module 310 may be configured to perform such scam analyses automatically, rather than upon user request. The scam analysis module 310 further may be configured to acquire and store voice data 312 and caller number data 314, and to transfer this data for received calls to the remote service 320. In implementations in which the voice communication devices may perform a scam analysis locally, the voice data 312 and the caller number data 314 also may include other voice samples and other telephone numbers than those acquired in a currently received call.

The remote service 320 likewise comprises a processor 322, a communication subsystem 326, and a storage subsystem 328. The storage subsystem 328 includes stored instructions that are executable to operate a scam risk analysis module 330 for performing a scam risk determination based upon information received from the voice communication devices 301, 303, 305. The storage subsystem 328 also includes voice data 332 and caller number data 334 stored for calls that have been previously submitted for determination of a scam risk. In some examples, voice data 332 and caller number data 334 for a call submitted for a scam risk determination may be stored for calls that are terminated by users via user interface controls presented on voice communication devices for the purpose of terminating likely scam calls. As described above, the occurrence of such a termination may be considered confirmation that the call was a likely scam call in some examples.

In some examples, caller voice and number data that is used in a scam risk determination may be weighted based upon a number of and/or frequency of scam analysis requests or scam confirmations associated with a particular caller. In such an example, each voice sample that is received may be analyzed for similarity to stored voice samples. Where a similarity is determined with a sufficient confidence level, then the voice samples may be considered to represent a same caller. The more instances of likely scam calls that are associated with a same caller, the more heavily the voice sample and number(s) associated with the voice sample may be weighted in future scam risk analyses. In other examples, voice sample data and/or caller number data may be weighted based upon any other suitable factors in a scam risk determination, or may be unweighted.

Figure 4:
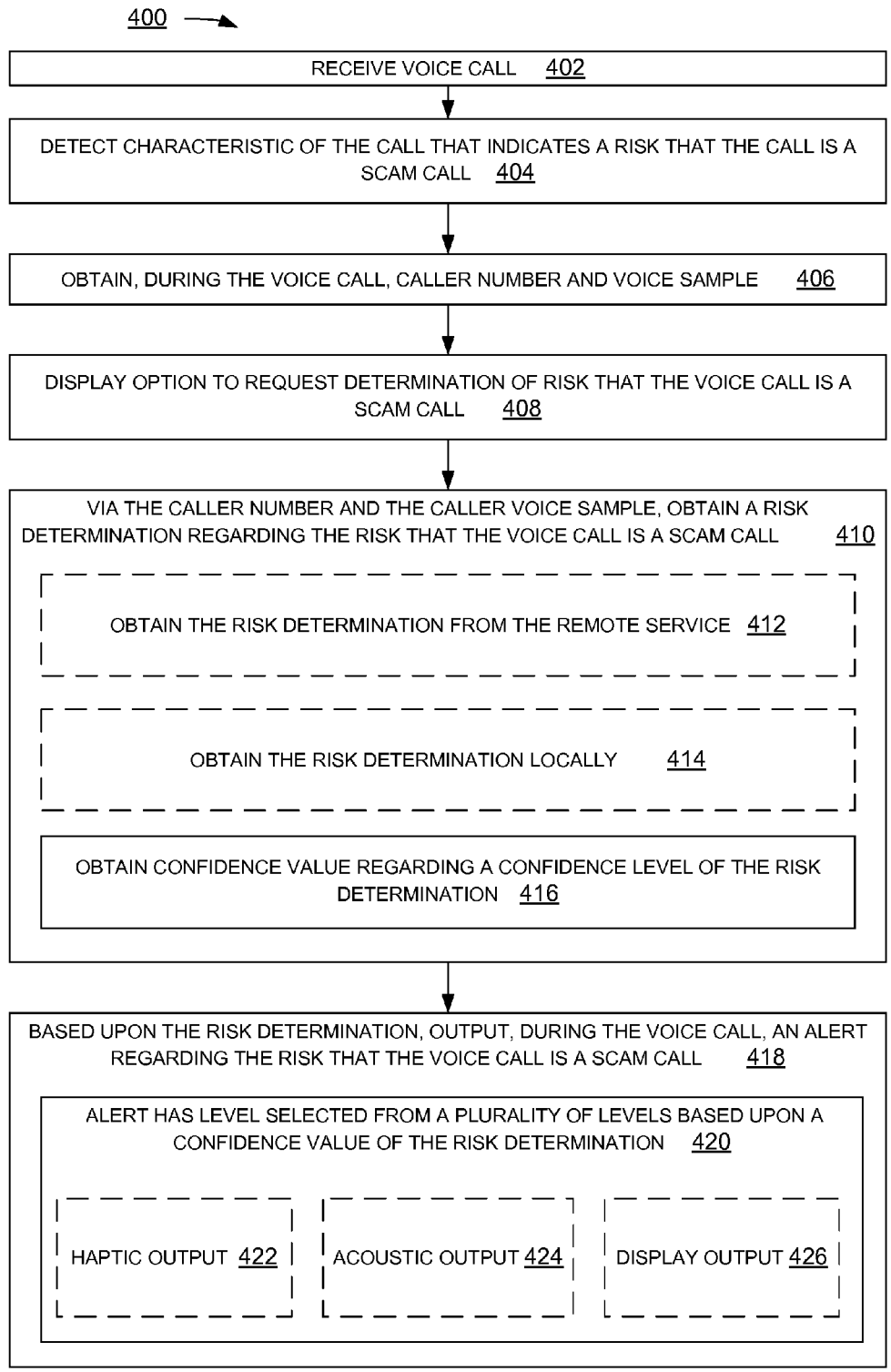
FIG. 4 shows an example method for providing a scam risk alert.

FIG. 4 shows an example method 400 for determining a risk that a received voice call is a scam call, and also for alerting a recipient of the call regarding a potential risk. The method 400 comprises, at 402, receiving a voice telephone call, and at 404, displaying on a user interface an option to request a determination of a risk that the voice call is a scam call. The user interface may be displayed for all incoming calls, incoming calls from unknown callers (e.g. as determined based upon a contact list of a user or other suitable data), or for any other suitable set of incoming calls. Further, in some examples, a scam analysis may be performed automatically, in which case display of the user interface may be omitted.

The method 400 further includes, at 406, receiving, during the voice call, in input requesting a determination of the risk that the call is a scam call. The request may be received, for example, via selection of a user interface control on a touch sensitive display, or may be received via other suitable user input mechanism. In response to the request, the method 400 comprises, at 408, obtaining, during the voice call, a caller number and a caller voice sample.

Continuing, at 410, method 400 comprises obtaining, via the caller number and the caller voice sample, a risk determination regarding a risk that the voice call is a scam call. As described above, in some examples, the risk determination may be obtained by sending the voice sample and the caller number to a remote service, as shown at 412. The remote service then compares the voice sample and the caller number to samples/numbers previously determined to be likely associated with a scam risk. In other examples, the risk determination may be obtained locally by comparing the caller number and the caller voice sample to caller number data and caller voice sample data stored locally on the computing device. In such examples, updated voice sample data and caller number data may be received from the remote service to keep the locally stored data current. Obtaining the risk determination further may include obtaining a confidence value regarding a confidence level of the risk determination, as indicated at 416. Such a confidence value may indicate a relative confidence of the call being a scam call, and may take any suitable form, including but limited to fractional/decimal and percentage forms.

Method 400 further comprises, at 418, outputting during the voice call an alert regarding the risk that the voice call is a scam call. The alert may take any suitable form. In some examples, the risk determination may return a binary high risk/low risk result based upon whether the determined risk meets a threshold. In such examples, the alert may include a notification regarding the applicable level of risk. In other examples, the risk determination may provide for a wider range of values. In such examples, the output may comprise a notification of a risk level selected from a plurality of levels based upon the confidence value. Additionally, the risk determination may include a confidence value regarding a relative confidence that the determined risk level is correct, as indicated at 420. The alert may take any suitable form. For example, as mentioned above, an alert may be provided as one or more of a haptic output 422, an acoustic output 424, and a display output 426.

The examples described herein may allow a person to obtain, during a voice call, a determination regarding a risk that the call may be a scam call. This may allow a recipient of the call to take actions to mitigate risks during the call, such as terminating the call before any personal or confidential information is exchanged. Also, providing voice samples and caller numbers to a remote service accessed by multiple voice communication devices may help to prevent others from being scammed by the same caller in the future, and may help to increase a reliability of scam determinations as more voice and number data is stored over time.

In some examples, the methods and processes described above may be tied to a computing system of one or more computing devices. In particular, such methods and processes may be implemented as a computer-application program or service, an application-programming interface (API), a library, and/or other computer-program product.

Figure 5:
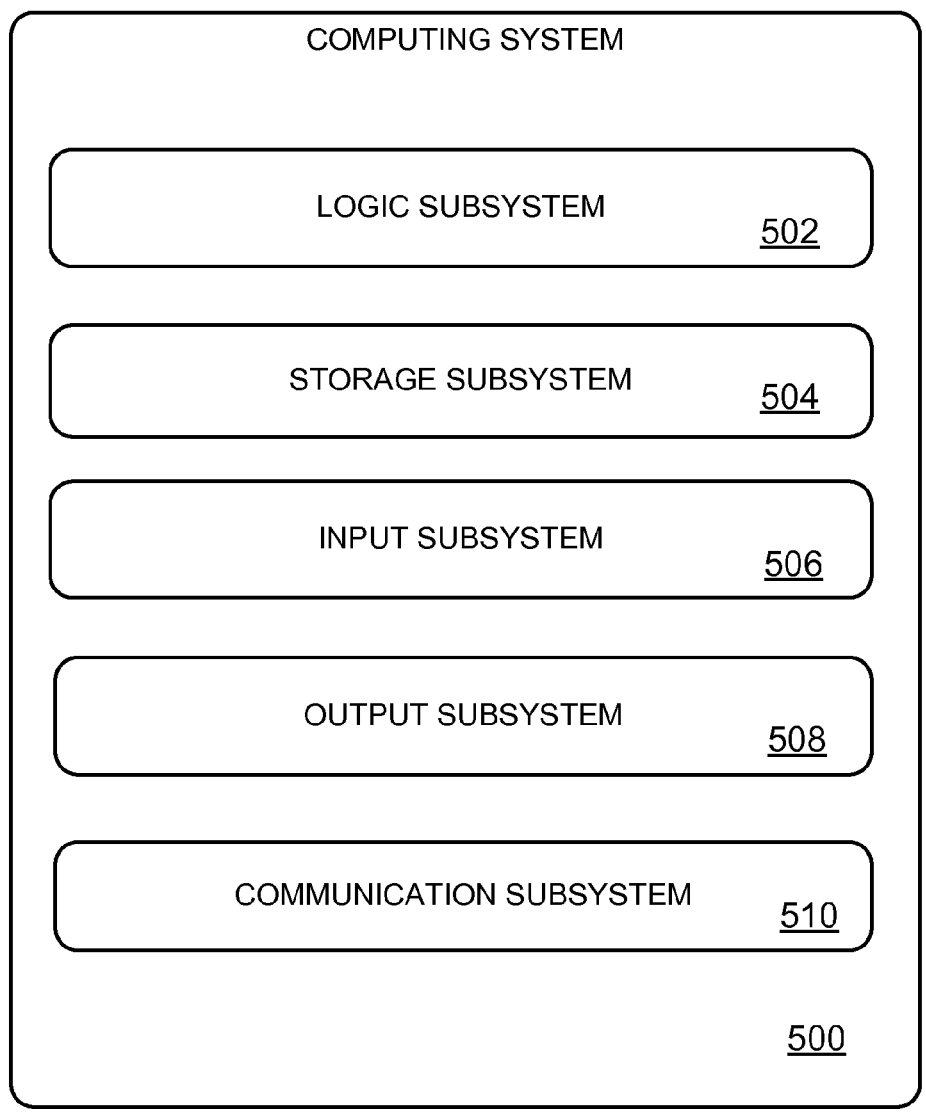
FIG. 5 schematically shows a block diagram of an example computing system.

FIG. 5 schematically shows a non-limiting embodiment of a computing system 500 that can enact one or more of the methods and processes described above. Voice communication device 102 may be one non-limiting example of computing system 500. Remote service system 320 may be another non-limiting example of computing system 500. Computing system 500 is shown in simplified form. It will be understood that virtually any computer architecture may be used without departing from the scope of this disclosure. In different embodiments, computing system 500 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

Computing system 500 includes a logic subsystem 502 and a storage subsystem 504. Computing system 500 may optionally include an input subsystem 506, an output subsystem 508, a communication subsystem 510, and/or other components not shown in FIG. 5.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 504 includes one or more physical devices configured to hold data and/or instructions executable by the logic subsystem to implement the methods and processes described herein. When such methods and processes are implemented, the state of storage subsystem 504 may be transformed—e.g., to hold different data.

Storage subsystem 504 may include removable media and/or built-in devices. Storage subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 504 includes one or more physical devices. However, in some embodiments, aspects of the instructions described herein may be propagated by a pure signal (e.g., an electromagnetic signal, an optical signal, etc.) via a communications medium, as opposed to being stored on a storage device. Furthermore, data and/or other forms of information pertaining to the present disclosure may be propagated by a pure signal.

In some embodiments, aspects of logic subsystem 502 and of storage subsystem 504 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, output subsystem 508 may be used to present a visual representation of data held by storage subsystem 504. This visual representation may take the form of a graphical user interface (GUI). As the herein described methods and processes change the data held by the storage subsystem, and thus transform the state of the storage subsystem, the state of output subsystem 508 may likewise be transformed to visually represent changes in the underlying data. Output subsystem 508 may include one or more display devices utilizing virtually any type of technology. Such display devices may be combined with logic subsystem 502 and/or storage subsystem 504 in a shared enclosure, or such display devices may be peripheral display devices.

As another example, when included, output subsystem 508 may be used to present audio representations of data held by storage subsystem 504. These audio representations may take the form of one or more audio signals output to one or more speakers. As the herein described methods and processes change the data held by the storage subsystem, and thus transform the state of the storage subsystem, the state of output subsystem 508 may likewise be transformed represent changes in the underlying data via audio signals.

Output subsystem 508 may include one or more audio rendering devices utilizing virtually any type of technology. Such audio devices may be combined with logic subsystem 502 and/or storage subsystem 504 in a shared enclosure, or such audio devices may be peripheral audio devices. Output subsystem 508 may include any other suitable output devices, including but not limited to haptic output devices, such as vibratory devices.

When included, input subsystem 506 may comprise or interface with one or more user-input devices such as a keyboard, mouse, touch screen, or game controller. In some embodiments, the input subsystem 506 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Another example provides a method of alerting of a potential scam call comprising receiving a voice call, obtaining, during the voice call, a caller number and a caller voice sample, via the caller number and the caller voice sample, obtaining a risk determination regarding the risk that the voice call is a scam call, and based upon the risk determination, outputting, during the voice call, an alert regarding the risk that the voice call is a scam call. The method may additionally or alternatively include, during the voice call, displaying on a user interface of the computing device an option to request the risk determination that the voice call is a scam call. Obtaining, during the voice call, the risk determination may additionally or alternatively include sending the caller number and caller voice sample to a remote service, and obtaining the risk determination from the remote service. Receiving, during the voice call, the risk determination may include receiving a confidence value regarding a confidence level of the risk determination. Obtaining, during the voice call, the risk determination may additionally or alternatively include comparing one or more of the caller number and the caller voice sample to locally stored caller information to obtain the risk determination. Obtaining, during the voice call, the risk determination may additionally or alternatively include receiving a confidence value regarding a confidence level of the risk determination. Obtaining, during the voice call, the risk determination may additionally or alternatively include comparing one or more of the caller number and the caller voice sample to locally stored caller information to obtain the risk determination. The method may additionally or alternatively include outputting the alert regarding the risk that the voice call is a scam call comprising outputting an alert via a haptic output mechanism. The method may additionally or alternatively include outputting the alert regarding the risk that the voice call is a scam call comprising outputting an alert on a display of the computing device. The method may additionally or alternatively include outputting the alert regarding the risk that the voice call is a scam call comprising outputting the alert via a speaker. The method may additionally or alternatively include outputting on the user interface an alert having a level selected from a plurality of levels based upon a confidence value of the risk determination.

Another example provides a computing device configured to receive and transmit voice communications comprising a processor, a communications subsystem, a storage subsystem, a display, and a memory comprising instructions executable by the processor. The instructions are executable to receive a voice call, obtain, during the voice call, a caller number and a caller voice sample, via the caller number and the caller voice sample, obtain a risk determination regarding the risk that the voice call is a scam call, and based upon the risk determination, output to the display, during the voice call, an alert regarding the risk that the voice call is a scam call. The instructions may additionally or alternatively be executable to, during the voice call, display on a user interface of the computing device an option to request the risk determination that the voice call is a scam call. The instructions may additionally or alternatively include instructions executable to obtain, during the voice call, the risk determination by comparing one or more of the caller number and the caller voice sample to the storage subsystem storing caller information. The instructions may additionally or alternatively include instructions executable to obtain, during the voice call, the risk determination by sending the voice sample and the caller number to a remote service, and receiving the risk determination from the remote service. The instructions may additionally or alternatively include instructions executable to output the alert regarding the risk that the voice call is a scam call on a display device. The instructions may additionally or alternatively include instructions executable to receive an input ending the call after outputting the alert, and send a confirmation to a remote service that the call was likely a scam call upon receiving the input ending the call.

Another example provides a computing device comprising a processor, a communications subsystem, a storage subsystem, a touch-sensitive display, and a memory comprising instructions executable by the processor, wherein the instructions are executable to receive a voice call, display on the touch-sensitive display a user interface control for requesting a risk determination regarding the risk that the call is a scam call, receive a user input via the user interface control, in response to receiving the input, obtain, during the voice call, a caller number and a caller voice sample, via the caller number and the caller voice sample, obtain a risk determination regarding the risk that the voice call is a scam call, and output to the touch-sensitive display, during the voice call, an alert regarding the risk that the voice call is a scam call. The instructions may additionally or alternatively include instructions executable to output one or more of a haptic alert and an audio alert. The instructions may additionally or alternatively include instructions executable to output an alert comprising a level selected from a plurality of levels based upon a confidence value. The instructions may additionally or alternatively include instructions executable to receive an input ending the call after outputting the alert, and to send a confirmation to a remote service that the call was likely a scam call upon receiving the input ending the call.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device configured to receive voice calls, the computing device comprising memory and a processor, a method of alerting of a potential scam call, the method comprising:
   receiving a voice call;
   obtaining, during the voice call, a caller number and a caller voice sample;
   receiving a user input requesting a risk determination regarding a risk that the voice call is a scam call; and
   via the caller number and the caller voice sample, obtaining the risk determination regarding the risk that the voice call is a scam call; and
   based upon the risk determination, outputting, during the voice call, an alert regarding the risk that the voice call is a scam call.

2. The method of claim 1, further comprising, during the voice call, displaying on a user interface of the computing device an option to request the risk determination that the voice call is a scam call.

3. The method of claim 1, wherein obtaining, during the voice call, the risk determination comprises sending the caller number and caller voice sample to a remote service, and obtaining the risk determination from the remote service.

4. The method of claim 3, wherein receiving the risk determination comprises receiving a confidence value regarding a confidence level of the risk determination.

5. The method of claim 1, wherein obtaining, during the voice call, the risk determination comprises comparing one or more of the caller number and the caller voice sample to locally stored caller information to obtain the risk determination.

6. The method of claim 5, wherein obtaining the risk determination comprises determining a confidence value regarding a confidence level of the risk determination.

7. The method of claim 1, wherein outputting the alert regarding the risk that the voice call is a scam call comprises outputting an alert via a haptic output mechanism.

8. The method of claim 1, wherein outputting the alert regarding the risk that the voice call is a scam call comprises outputting an alert on a display of the computing device.

9. The method of claim 1, wherein outputting the alert comprises outputting the alert via a speaker.

10. The method of claim 1, further outputting on the user interface an alert having a level selected from a plurality of levels based upon a confidence value of the risk determination.

11. A computing device configured to receive and transmit voice communications, the computing device comprising:
   a processor;

a communications subsystem;
a storage subsystem;
a display; and
memory comprising instructions executable by the processor to:
  receive a voice call;
  obtain, during the voice call, a caller number and a caller voice sample;
  receive a user input requesting a risk determination regarding a risk that the voice call is a scam call; and
  via the caller number and the caller voice sample, obtain the risk determination regarding the risk that the voice call is a scam call; and
  based upon the risk determination, output to the display, during the voice call, an alert regarding the risk that the voice call is a scam call.

12. The device of claim 11, wherein the instructions are further executable to, during the voice call, display on a user interface of the computing device an option to request the risk determination that the voice call is a scam call.

13. The device of claim 11, wherein the instructions are executable to obtain, during the voice call, the risk determination by comparing one or more of the caller number and the caller voice sample to the storage subsystem storing caller information.

14. The device of claim 11, wherein the instructions are executable to obtain, during the voice call, the risk determination by sending the voice sample and the caller number to a remote service, and receive the risk determination from the remote service.

15. The device of claim 11, wherein the instructions are executable to output the alert regarding the risk that the voice call is a scam call on a display device.

16. The device of claim 11, wherein the instructions are executable to receive an input ending the call after outputting the alert, and to send a confirmation to a remote service that the call was likely a scam call upon receiving the input ending the call.

17. A computing device, comprising:
a processor;
a communications subsystem;
a storage subsystem;
a touch-sensitive display; and
memory comprising instructions executable by the processor to:
  receive a voice call;
  display on the touch-sensitive display a user interface control for requesting a risk determination regarding the risk that the call is a scam call;
  receive a user input via the user interface control requesting the risk determination regarding the risk that the voice call is a scam call; and;
  in response to receiving the user input, obtain, during the voice call, a caller number and a caller voice sample;
  via the caller number and the caller voice sample, obtain the risk determination regarding the risk that the voice call is a scam call; and
  output to the touch-sensitive display, during the voice call, an alert regarding the risk that the voice call is a scam call.

18. The device of claim 17, wherein the instructions are further executable to output one or more of a haptic alert and an audio alert.

19. The device of claim 17, wherein the risk determination comprises a confidence value, and wherein the instructions executable to output the alert are executable to output an alert comprising a level selected from a plurality of levels based upon a confidence value.

20. The device of claim 17, wherein the instructions are executable to receive an input ending the call after outputting the alert, and to send a confirmation to a remote service that the call was likely a scam call upon receiving the input ending the call.

* * * * *